June 15, 1965 H. E. LINTHICUM ETAL 3,188,850
TUBE EXPANDER TOOL
Filed Feb. 21, 1963 2 Sheets-Sheet 1

INVENTORS.
HARLEY E. LINTHICUM.
WILLIAM A. LINTHICUM.
BY Raymond Curtin

ATTORNEY.

INVENTORS.
HARLEY E. LINTHICUM.
WILLIAM A. LINTHICUM.

ATTORNEY.

United States Patent Office 3,188,850
Patented June 15, 1965

3,188,850
TUBE EXPANDER TOOL
Harley E. Linthicum and William A. Linthicum, Springfield, Ohio, assignors to Carrier Corporation, Syracuse, N.Y., a corporation of Delaware
Filed Feb. 21, 1963, Ser. No. 260,174
5 Claims. (Cl. 72—393)

This invention relates broadly to metal working tools. More particularly, this invention relates to metal working tools of the type used to roll a tubular member into tight intimate contact with a structural support member by cold working the metal through radial expansion.

Tools of the kind under consideration employ a plurality of roller elements, together with means for effecting radial movement of the rollers for the purpose of expanding a tube from the inside outwardly into tight mechanical engagement with walls forming an aperture or opening in a structural member such as a tube sheet employed for the purpose of supporting the tube.

In some instances, it is desirable that the actual union between the tube and the tube sheet be accomplished at some distance inward from the end of the tube supported in the tube sheet. For illustration, when the end of the tube is welded to the tube sheet, it is desirable to effectuate the rolling action inwardly of the welded area.

This invention has for its chief object the provision of a tool of the kind that will accomplish this type of rolling action with a novel telescoping relationship between the various parts forming the tool.

A further object of the invention is a provision of a tool of the kind described wherein a mandrel, together with a novel drive means therefor are telescopically arranged within a housing mounting the roller elements.

An additional object of the invention is the provision of a tool of the type described wherein a mandrel member, together with its drive mechanism is arranged to have a first position in which the mandrel is free of operative engagement with the roller elements so that the tool may pass into the open end of a tube to be rolled and a second position in which the mandrel operatively engages the roller elements so that rotation imparted to the mandrel also involves movement of the roller elements in such a manner that the mandrel is moved axially of its drive head. The axial movement of the mandrel is such that the roller elements are driven radially outward so as to cold work the tube wall or tubular element by radial expansion into tight intimate contact with the walls of the opening in a structural member accommodating the tube member.

Other objects and features of the invention will be apparent upon a consideration of the ensuing specification and drawings in which.

Figure 1:
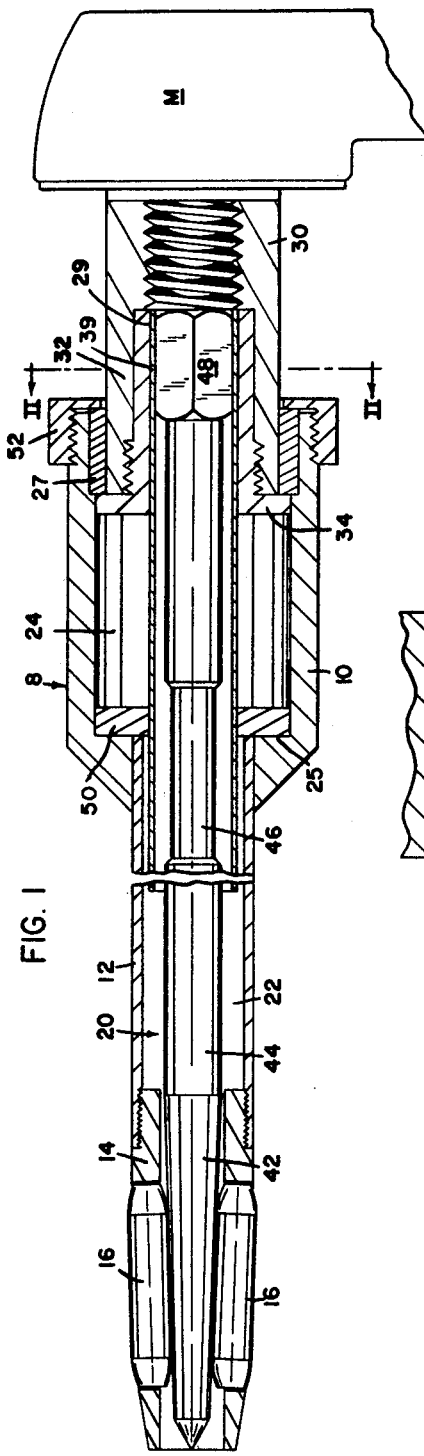
FIGURE 1 is a side view, partially in section of a tool constructed in accordance with the teachings of this invention.

Referring to the drawings for an illustration of a preferred embodiment of this invention, there is shown a first sub-assembly 8 referred to hereinafter as the tubular housing consisting of a body member 10, tubular extension member 12 and a roller cage assembly 14. Mounted within the cage assembly 14 are a plurality of roller elements 16. The roller elements are circumferentially spaced about the cage member in slots arranged so that the roller elements may rotate about their axis and also enjoy limited radial movement with regard to the center of the cage construction. In addition, the roller elements are skewed in relation to the central axis of the cage member. The body 10, together with the extension 12 and cage 14 define a passage 20 extending through the housing. The passage has a first portion 22 of reduced diameter and a second portion 24 of expanded diameter forming a shoulder 25 within the body for a purpose to be later described.

Figure 2:
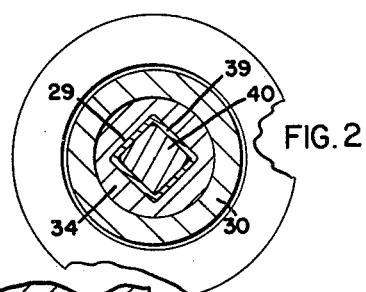
FIGURE 2 is a cross-section taken along the lines II—II on FIGURE 1 illustrating the arrangement of certain parts of the tool.

In addition to the housing assembly described, there is provided a mandrel drive assembly 30 comprising a rotary head member 32 having a piston element 34 threadably secured thereto. The head 32 is preferably circular and is mounted for rotational movement within the body member 10 by a bearing 27. The piston member has an opening 29 extending therethrough which is square in section as shown in FIGURE 2. In addition, the head includes an internally threaded portion for connection with a motor M for imparting rotary motion to the head. Tightly assembled within piston member 34 is a drive tube 39. Assembled within the drive tube 39 is a mandrel member 40. The purpose of the mandrel is to provide movement to the roller members radially outwardly from the central axis of the tool. To accomplish this the mandrel has a tapered end portion 42, an intermediate portion 44 and a relieved portion 46. The mandrel has a head 48 complementary to the drive tube so that rotary motion imparted to the drive tube will be transmitted directly to the mandrel. In addition, with the construction shown, the mandrel 40 may be moved axially relative to the drive tube in a manner to be later described.

Assembled within the body member 10 adjacent shoulder 25 is a thrust bearing 50. A retainer cap 52 is threadably connected to the body member 12 for the purpose of maintaining the parts in the position shown.

Figure 3:
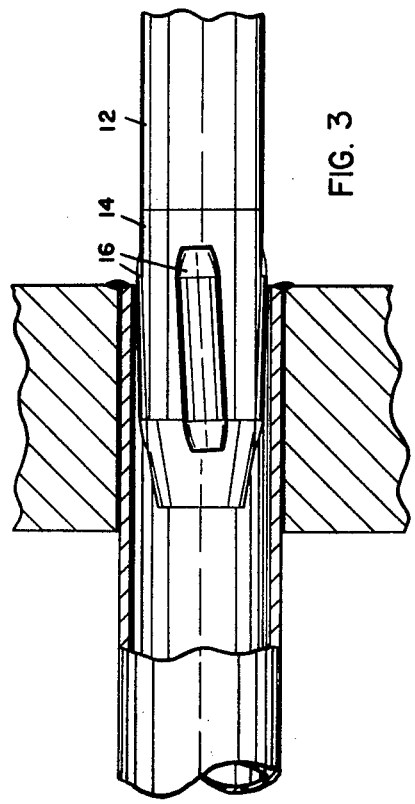
FIGURE 3 is a view illustrating the operation of the tool showing the relative position of certain parts of the tool as it initially penetrates the work.
Figure 5:
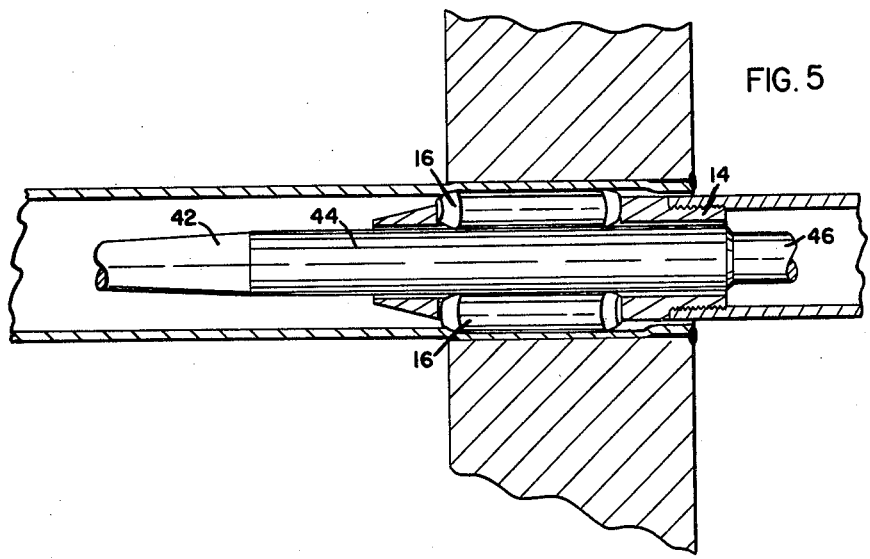
FIGURE 5 is a further view illustrating the operation of the tool during the period when radial expansion of the tube is accomplished.
Figure 4:
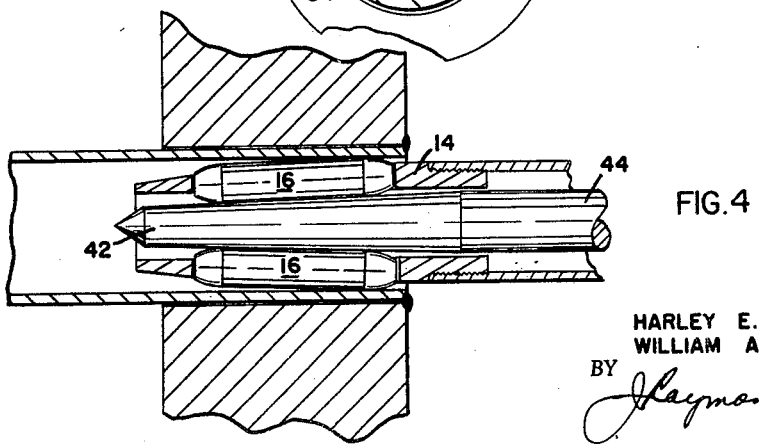
FIGURE 4 is a view similar to FIGURE 3 showing the relative position of certain parts of the tool as it engages the tubular member just prior to effecting radial expansion thereof.

Considering the operation of the tool with the parts in the position shown in FIGURE 1, the tool is inserted into the open end of a tube, note FIGURE 3, to a desired distance, note FIGURE 4.

This is accomplished by the operator inserting the tool into the tube until the tool and tube assume the relative position illustrated in FIGURE 4. The tool is then operated by the operator lightly supporting body member 10 and advancing the drive head assembly 30 relative to the tubular assembly 8 until the tapered end of the mandrel forces the rollers 16 radially outward into forcible engagement with the inner wall of the tube. Motor M is energized causing rotary movement of the drive assembly 30 as well as rotary movement of the tubular assembly 8. It will be understood that movement of the tubular assembly 8 is at a reduced rate relative to the rate of movement of the drive assembly.

Because of the disposition of rollers 16, movement of the cage assembly 14 imparts axial or forward movement to the mandrel 40, which in turn, "drags" or advances the other parts forming the drive assembly by virtue of its frictional engagement with the other parts. Eventually, the piston 34 will engage thrust bearing 50. The particular spline-type connection between mandrel head 48 and the drive tube 39 permits continued advance of the mandrel relative to the drive assembly. At the same time, it will be appreciated that forward movement of the cage assembly occurs as the rollers forcibly engage the tube wall.

Thus with the spline-type arrangement, it is possible to continue the advance of the mandrel until section 46 of the mandrel is in registry with the roller elements. When this occurs, the roller elements drop into the space created by the relieved portion 46 of the mandrel and discontinue further advance of the mandrel as well as the continued radial outward force. The union is now complete and the entire tool extracted from the tube. When the tool is free of the tube, the tool is inverted so that the cage portion extends upwardly allowing the mandrel to drop so that the head portion of the mandrel is nested within the lower section of the drive tube. The operator then extracts the drive head assembly from engagement with the thrust bearing to the position shown in FIGURE 1. The tool is then ready for use with other tubes forming a part of a general work assembly.

It will be obvious that the telescopic action described enables the tool to be used in relatively inaccessible locations.

The above disclosure has been given by way of illustration and elucidation, and not by way of limitation, and it is desired to protect all embodiments of the herein disclosed inventive concept within the scope of the appended claims.

We claim:

1. A tool for uniting the ends of a tube with an apertured support member by radially expanding at least a portion of the tube into tight contact with the walls defining the tube receiving aperture comprising:
   (a) a plurality of roller elements;
   (b) hollow cage means retaining said elements circumferentially spaced and axially skewed about the longitudinal axis thereof;
   (c) cage extension means coextensive with said cage means;
   (d) a hollow body member affixed to said cage extension means to form with said cage means and said cage extension means a continuous passage with the portion defined by said body member being larger in diameter to form a shoulder therein;
   (e) a rotatable head mounted within the portion of the passage disposed in said body member;
   (f) a hollow piston threadably connected to said rotatable head to form an extension thereof, said piston being provided with a passage, non-circular in cross-section;
   (g) a drive tube having a cross-section complementary to the cross-section of said piston passage secured to said piston and depending therefrom, said drive tube being dimensioned so as to extend into the portion of the passage having the reduced diameter; and
   (h) tapered mandrel means received within said tube for rotation therewith and axial movement relative thereto, the parts being constructed and arranged so that movement of said head relative to said body member positions the tapered mandrel in engagement with the rollers sufficient to radially displace them into contact with a tube positioned in the walls of the opening in the support member whereby motion imparted to the cage by the body member will accomplish axial movement of said mandrel through the roller elements.

2. A tool for radially expanding or rolling a tubular member into engagement with a structural support member comprising:
   (a) means forming a housing having a passage extending therethrough;
   (b) roller means mounted in said housing in communication with said passage;
   (c) mandrel means arranged in said housing for axial movement in said passage; and
   (d) rotatable drive means, operatively connected to said mandrel means, positioned within said passage, said drive means being connected with said housing so that rotation imparted to said drive means is transmitted to said housing at a reduced rate, said drive means having a first position within said passage such that said mandrel is free of operative engagement with said rollers and a second position such that said mandrel operatively engages said rollers.

3. A tool for uniting the terminal end of a tubular member with a support having an opening therein for accommodating said tubular member terminal end comprising:
   (a) means forming a housing having a passage extending therethrough;
   (b) roller means circumferentially spaced about a portion of the periphery of the housing, said roller means being arranged so as to have limited radial movement relative to said housing, said roller means being in communication with said passage;
   (c) mandrel means disposed within said passage;
   (d) drive head means operatively associated with said mandrel disposed within said passage, said drive means being arranged within said passage so as to have ascial movement relative to said housing; and
   (e) means forming a connection between said mandrel means and said drive head means whereby relative axial movement between said drive head means and said mandrel means may be accomplished.

4. The invention set forth in claim 3 wherein said last-mentioned means comprises a spline fit between said mandrel means and said connection means.

5. The invention set forth in claim 3 wherein means are provided for transmitting rotary motion imparted to said drive head means to said housing means.

References Cited by the Examiner

UNITED STATES PATENTS

| 2,400,548 | 5/46 | Geertsema | 29—240.5 |
| 3,047,045 | 7/62 | Baker | 153—82 |

CHARLES W. LANHAM, *Primary Examiner*.